Feb. 28, 1928.

J. S. POCOVÍ

1,660,355

FILM MOVING MECHANISM FOR CINEMATOGRAPH APPARATUS

Filed April 24 1925

Inventor
J. S. Pocoví
by
W. E. Evans
Attorney

Patented Feb. 28, 1928.

1,660,355

UNITED STATES PATENT OFFICE.

JUAN SASTRE POCOVÍ, OF BARCELONA, SPAIN.

FILM-MOVING MECHANISM FOR CINEMATOGRAPH APPARATUS.

Application filed April 24, 1925, Serial No. 25,628, and in Spain November 7, 1924.

The present invention relates to feeding mechanism for films in cinematograph apparatus.

The invention has among its objects to avoid the use of toothed sprockets for moving the film in such apparatus and to substitute an oscillating arm or tractor lever device that engages upon the film throughout its width in such manner that the toothed sprocket fulfills merely the function of an auxiliary in causing the movement of the film without appreciable tractive effort, by which the film is subjected to less wear than otherwise would be the case.

Moreover, according to the invention the speed of operation of the arm or tractor lever device is regulated as well as the time period in which each image is exposed upon the projecting screen, in such manner that while the speed may reach a maximum it is possible to reduce the extent of the plates of the obturator and to obtain considerable luminosity in projection.

Figure 2:
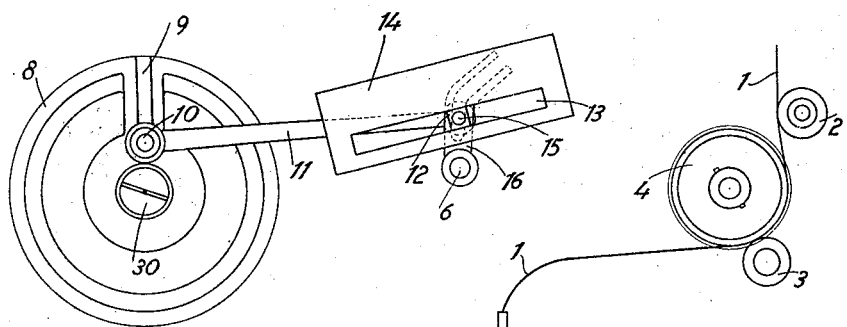
Figure 3:
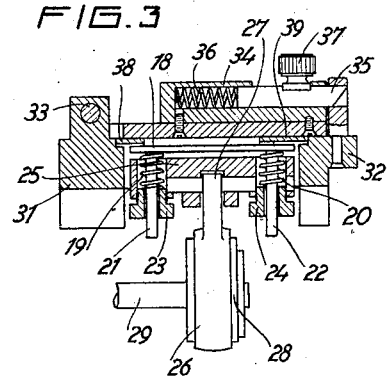
Figure 1:
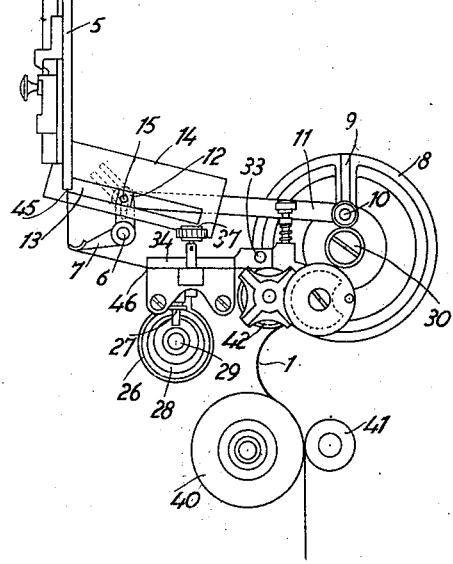
Figure 4:
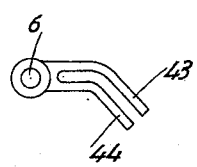

The invention is illustrated by way of example in the accompanying drawings in which, Figure 1 is a diagrammatic view of the mechanism as a whole, Figure 2 is a detail view on a larger scale of the flywheel or disc and operating rod of the mechanism, Figure 3 is a detail sectional view of the intermittent film gripping device, and Figure 4 represents a detail view of the forked member of the mechanism, whose function is hereinafter described.

In carrying the invention into effect as illustrated in the accompanying drawings, the film represented at 1 is caused to pass over guide rollers 2, 3 and 4, the last of which is provided with teeth, in known manner to engage the perforations provided upon the film near its respective edges.

At 5 is indicated a frame in which the projection aperture is provided, and at 6 the pivot pin fixedly carrying an arm 7 extending the whole width of the film 1, which operates intermittently as required in the function of the apparatus.

The movement of the pivoted arm 7 and of its pivot pin 6 is obtained from the flywheel or disc 8, mounted upon the motor spindle 30, the flywheel or disc having a radial groove 9 in which is fixed, at a greater or less distance from the axis of the spindle 30, the connecting pin 10 of a connecting rod 11, which on the rotation of the spindle causes the slide 12 to reciprocate within the guide way 13 provided in the member 14 mounted in a fixed position, the said slide 12 having provided upon it a pin or finger 15 engaging in an oscillating fork member or arm 16 also mounted fixedly upon the pin 6, the fork thus having an oscillating movement imparted to it under the action of slide 12 on its reciprocation.

The oscillating fork member or arm 16 is fixed at its lower end upon the pivot pin 6 of the pivoted arm 7, and consequently this arm 7 is also oscillated exactly as is the fork member or arm 16. The speed of the oscillating movement can by regulated by setting the connecting pin 10 at a greater or less distance from the axis of the spindle 30, in the radial groove 9.

The means for effecting the intermittent gripping of the film is represented in Figure 3, and comprises a frame which carries a plate 18 subjected to the action of two compression springs 19 and 20, traversed by two pins 21 and 22, which are fixed at their respective extremities on the plate 18. Screw threaded nuts 23, 24 serve respectively to regulate the compression of the springs 19 and 20, being screwed into screw threads formed in a block 25 upon which the whole is mounted and which is subject to the action of the eccentric strap 26 having an upwardly extending part 27. Within this strap 26 is disposed an eccentric 28 fixedly mounted upon the spindle 29 which is actuated by the motor by which the apparatus is driven.

The block 25 slides within guides 31, 32, and the guide 31 serves for pivotally mounting at 33 a part or door 34 which closes upon the said slides by means of a bolt 35 actuated by the helical spring 36. In order to open the part or door 34 the bolt 35 is retracted by means of the head 37. The part or door 34 comprises the projecting runners 38, 39 and the film is compelled to pass through the space between these runners and the plate 18.

The film 1 passes over the guide rollers 40, 41, 42, of which the guide roller 42 is provided with teeth which engage the perforations provided near the respective edges of the film, and thus the guide roller 42 is moved intermittently by the known Maltese cross device.

Thus the film, after having passed before the projection aperture in the frame 5, passes through the mechanism by which it is intermittently gripped between the runners 38, 39 and the plate 18, and between the drawing rollers 42 and 40, 41.

Between the frame 5 in which the projection aperture is provided and the intermittent film gripping mechanism, the oscillating arm 7 operates in such a manner that when the oscillating arm causes the intermittent advancement of the film, the engaging mechanism renders the film immovable, and when the pivoted arm 7 is separated from the film the engaging mechanism releases the film.

It will be understood that the two stems 43 and 44 of the fork member or arm 16 (Figure 4) are bent to an angle in such a manner that when the said fork member or arm is turned slightly upon its pivot 6, the extremities of the parts 43, 44 of the fork member or arm are disposed in such manner that the space or slot between them coincides with that of the guide way 13.

It will furthermore be understood that the intermittent entrainment of the film by means of the pivoted arm 7 is effected as before stated at the instants when the film is engaged between 18 and 38, 39, and when the movement of the film commences there remains between the edge 45 of the part 5, and the edge 46 of the intermittent gripping mechanism, a length of film 1 which forms a curved part and extends more or less according to the distance apart of the lateral perforations of the film.

The toothed sprocket or roller 42 is moved forward always at such a speed that it does not effect any traction on the film, but merely carries the film away, no matter what the distance between the perforations of the film or the height of photographic images of the film, and thus the apparatus is adapted to receive various films having various types of perforations.

It will be understood that the action of the oscillating arm 7 is such that at each stroke it effects an entrainment of the film to an extent slightly greater than the height of the images on the film, if the latter were tight; but this produces only the first traction, it being understood that after this there is formed between the edge 45 of the part 5 and the edge 46 of the intermittent gripping mechanism a length or curved portion of film and the greater this length the less will be the intensity of entrainment on the succeeding strokes of the arm 7, in such manner that the action of this latter will always be exercised exactly in proportion to the distance between the perforations of the film, and there will remain between 45 and 46 an excess of film sufficient to permit that the toothed sprocket on roller 42 driven as described through a Maltese cross device may effect only the transport of the film without exerting traction upon it thus avoiding wear of the perforations in the film.

The speed of operation of the pivoted arm 7 may be regulated by the variation of position of the connecting pin 10 in the radial groove 9, whereby the greater the distance of the connecting pin 10 from the axis of the spindle 30, the greater the linear movement imparted to the sliding block 12, and thus the greater the extent of movement of the fork member or arm 16 which operates the pivot pin 6 of the arm 7; the fork member or arm 16 is provided of an angular shape in such manner that the stems or parts 43, 44 become disposed parallel with the guide way 13, whereby the arm 7 is arrested during the time the pin or finger 15 passes through the slot in the end of the fork member or arm 16, so that thus each image remains on the screen a period determined according to the position of the connecting pin 10 in the radial groove 9. Thus, while the highest speed is secured for the changing of the images the greatest duration of exposure is secured of each upon the screen. This permits of reducing the extent of the obturations which are effected during the change of images, and consequently to obtain a luminosity in projection greater than that hitherto possible.

The mechanism described and represented may be modified in the form and disposition of its constituted parts without departing from the invention.

I claim:—

Feed mechanism for cinematographic films, comprising a frame having a projection aperture, positive means for withdrawing on each feed movement of the mechanism a length of film equal to the distance between the centres of successive images on the film, film gripping means disposed in position between the said frame and the said positive film withdrawing means and adapted to grip and to prevent return movement of the film during the feed movement thereof, means such as an eccentric for the actuation of said film gripping means, an arm pivotally mounted in position between the said frame and the said gripping means, and adapted at its outer end to engage the film to effect the feed movement thereof, the said arm having a stroke in excess of that necessary to bring successive images on the film into alignment with the said projection aperture, a second arm pivoted upon the same axis as, and fixedly connected to the said arm first referred to, a rotatable element, a crank pin mounted upon the said rotatable element and adjustable radially thereon, and a rod connecting the said crank pin to the said second arm, substantially as hereinbefore described.

JUAN SASTRE POCOVÍ.